(12) United States Patent
Shen et al.

(10) Patent No.: US 9,477,444 B1
(45) Date of Patent: Oct. 25, 2016

(54) METHOD AND APPARATUS FOR VALIDATING AND RECOMMENDING SOFTWARE ARCHITECTURES

(71) Applicant: CA, Inc., New York, NY (US)

(72) Inventors: Tony Shen, Beijing (CN); Kevin Liu, Beijing (CN)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/585,418

(22) Filed: Dec. 30, 2014

(51) Int. Cl.
*G06F 9/44* (2006.01)
*G06F 9/45* (2006.01)
*G06F 9/445* (2006.01)
*G06F 11/36* (2006.01)

(52) U.S. Cl.
CPC . *G06F 8/20* (2013.01); *G06F 8/75* (2013.01); *G06F 9/44589* (2013.01); *G06F 11/3604* (2013.01); *G06F 11/3608* (2013.01)

(58) Field of Classification Search
None
See application file for complete search history.

(56) References Cited

U.S. PATENT DOCUMENTS 7,810,079 B2 * 10/2010 Cates .................. G06F 11/3612
714/100
8,418,149 B2 * 4/2013 Krauss ................ G06F 11/3636
717/127

* cited by examiner

*Primary Examiner* — Lewis A Bullock, Jr.
*Assistant Examiner* — Mark Gooray
(74) *Attorney, Agent, or Firm* — Coats & Bennett, PLLC

(57) ABSTRACT

A control server receives information from detector agents associated with an application program being executed by a processor. The information, which is collected by the detector agents at runtime of the application, includes data with which the control server can generate a representation of the software architecture for the application. The control server compares the generated representation to representations of a set of known acceptable architectures. Based on the results of that comparison, the control server indicates whether the architecture of the application is a valid architecture. Recommendations for modifying the architecture of the application may be made in cases where the architecture is not deemed valid by the control server.

14 Claims, 5 Drawing Sheets

METHOD AND APPARATUS FOR VALIDATING AND RECOMMENDING SOFTWARE ARCHITECTURES

BACKGROUND

The present disclosure relates generally to methods for validating software applications, and particularly to a method and device for autonomously validating an architecture of a given software application.

There are many different software tools and paradigms that are currently available with which software developers can create software applications. Such applications are designed to execute as standalone processes on various different computing devices, while others are designed and implemented to execute on computer servers disposed in a communications network. In some instances, software applications are designed to communicate with each other using a client-server model over such networks to request and retrieve data.

Current software development platforms, such as the JAVA Execution Environment (JAVA EE), help to reduce the costs and complexity normally associated with developing large, complicated multi-tier enterprise services. This is due, at least in part, to the variety of different components available with which to build a software application, as well as the number of standard software architectures that define the development using these components. As those of ordinary skill in the art are aware, such components may include, but are not limited to, client components, browser components, bean components, message services components, database connectivity components, Relational Database Management System (RDBMS) components, Message Driven Bean (MDB) components, Servlet and Web Services (WS) components, and various other classes and functions.

There are many different ways to combine the multitude of various components provided by tools such as JAVA EE, and thus, many different ways to architect an enterprise application using such platforms. It is not always easy for developers to learn and build an application meeting a given standard architecture. And, when a given architecture standard is first introduced or upgraded, it is difficult for the software developers to determine whether existing applications meets these new or upgraded architectures.

BRIEF SUMMARY

The present disclosure provides a method and apparatus for validating the software architecture of an application program executing on a computing device. The validation is based on information gathered by the application program at runtime, and is compared to similarly structured information considered acceptable for such software architectures.

Therefore, in one embodiment of the present disclosure, a computer-implemented method comprises receiving, at a control device, information from an application program executing on a computing device. The application may be, for example, a client application executing on a client device, or a server application executing on a serving device, or both.

The received information comprises data associated with an architecture of the application program, and more specifically, data that identifies functions that process a message at runtime of the application program, as well as the invocation relationship between the functions that process the message. The method also comprises generating, at the control device, a representation of the architecture of the application program based on the information received from the application program. The method then compares, at the control device, the representation of the architecture of the application program to a representation of a predefined reference architecture stored in a memory, and will validate the architecture of the application program based on comparison.

In another embodiment, the present disclosure provides a control server comprising a communications interface circuit and a processing circuit. The communications interface circuit allows the control server to communicate with an application program executing on another computing device. The processor circuit receives information that is associated with an architecture of the application program, and then generates a representation of that architecture based on the received information. The data, as previously stated, is associated with an architecture of the application program, and more specifically, comprises data that identifies functions that process a message at runtime of the application program, as well as the invocation relationship between the functions that process the message. The processor circuit is also configured to compare the representation of the architecture of the application program to a representation of a predefined reference architecture stored in a memory, and validate the architecture of the application program based on the results.

In another embodiment, the present disclosure provides a computer-readable storage medium comprising a control application that, when executed by a processing circuit on a computing device, configures the processing circuit to receive information from an application program executing on a computing device. As above, the information comprises data associated with an architecture of the application program, and more specifically, data that identifies functions that process a message at runtime of the application program, as well as the invocation relationship between the functions that process the message. The control application also generates a representation of the architecture of the application program based on the information received from the application program, and compares that representation to a representation of a predefined reference architecture stored in a memory; and validates the architecture of the application program based on the result.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
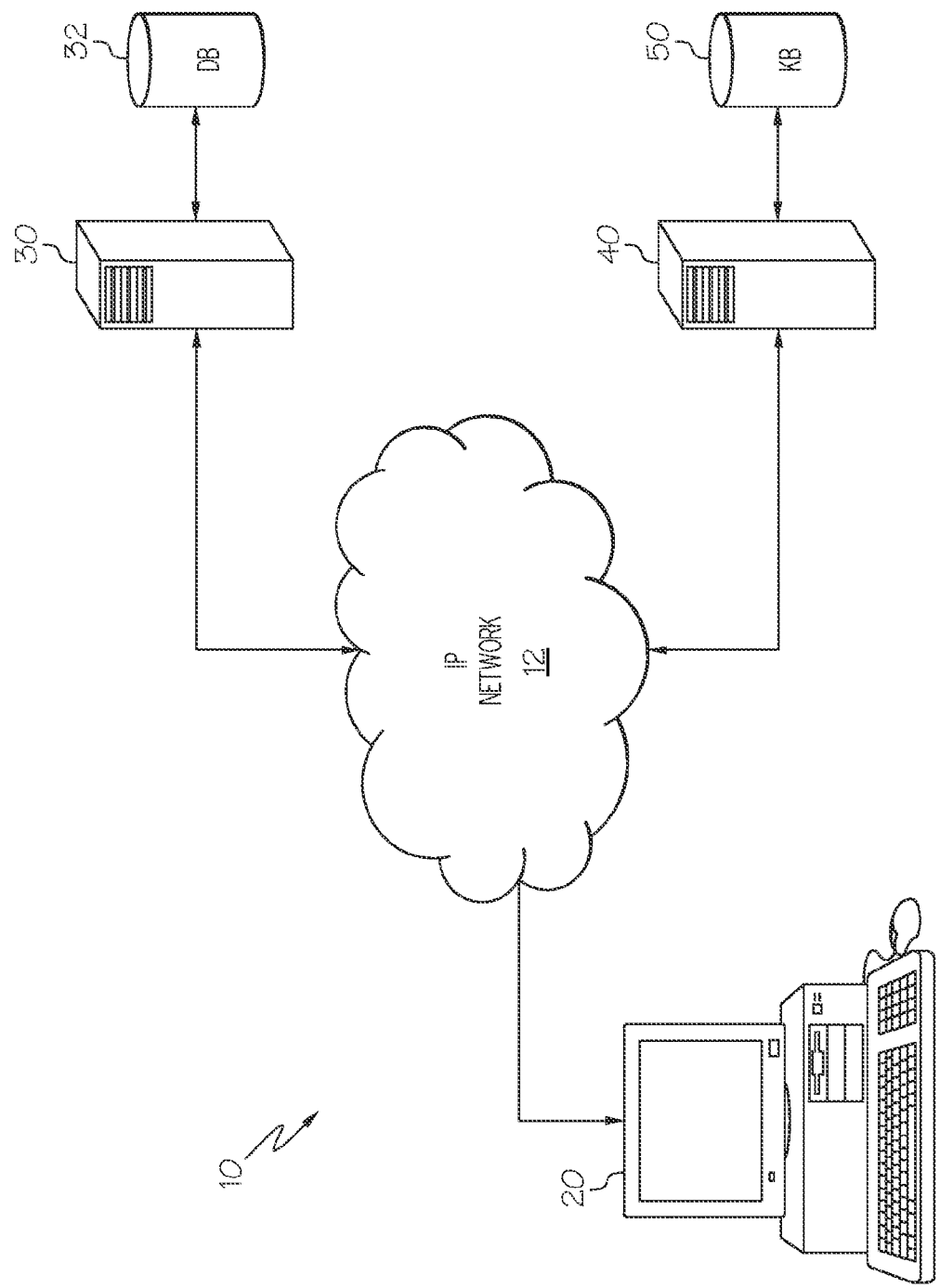
FIG. 1 is a block diagram illustrating some functional components of a communications network configured according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a method, a computing device, and a computer-readable storage medium for autonomously verifying the architecture of a given software application. Particularly, embodiments of the present disclosure analyze the path of one or more selected commands (e.g., function calls or other command requests for data) issued by a client software application to a server software application. Generally, the commands represent "typical" commands that a client application would normally send to invoke the functions of the server application under most operating conditions. The commands are chosen, however, to ensure that most or all of the key components of the software applications at one or both of the client device and the server device are invoked. This is because invoking the key components of the application(s) will provide the most accurate representation of the software architecture of the application(s).

To generate the architecture according to the present disclosure, one embodiment of the present disclosure provides a "detector" in each functions of a software application. As defined herein, a "detector" is a software construct, such as an agent, for example, executed by the processor circuit of a computing device while the application is running. In at least some embodiments, the detectors are part of the code comprising the application, and are configured to intercept the commands received at its particular associated function as those commands are processed by the function. During processing, each detector extracts selected information received at the function and sends that selected information to an architecture generator.

The architecture generator then utilizes that information to build a representation of the current software architecture for the application, and compares that generated representation to a knowledge base containing representations of different known standard architectures. Based on the comparison, the architecture generator determines whether the architecture for the application under test satisfies or violates some predefined requirements, such as an accepted set of rules, for example, for a given standard architecture. Applications having an architecture that is determined to violate an acceptable standard architecture are reported to an operator. If the architecture generator can identify a better architecture for the application, the architecture generator will suggest that architecture to the operator. In some embodiments, the application generator may also provide some recommendations for altering the application code to conform the application's current architecture to that of the suggested standard architecture.

Turning now to the drawings, FIG. 1 is a block diagram illustrating some of the components of a computer network configured according to embodiments of the present disclosure. As seen in FIG. 1, an IP network 12, such as the Internet, for example, or some other private and/or public packet data network, communicatively interconnects a client terminal 20 with one or more application servers (AS) 30 having access to a data storage medium, such as database (DB) 32. As seen later in more detail, each of the client device 20 and the AS 30 execute a corresponding application program. Particularly, the client device 20 executes a client application program, while the AS 30 executes a server application program. In operation, the client application running on client device 20 generally communicates commands that are requests for data, for example, to the server application executing on AS 30 via network 12. While not specifically shown herein, those of ordinary skill in the art will readily appreciate that any communication protocol, such as the well-known Transmission Control Part/Internet Protocol (TCP/IP) may be used to facilitate those communications. Upon receipt of the commands, the server application executing on AS 30 retrieves the requested data from DB 32, if available, and sends the requested data in a corresponding response back to the client application executing on client device 20 for processing.

In the embodiment of FIG. 1, each of the client application and the server application executing on the client device 20 and AS 30, respectively, are constructed in accordance with a particular software architecture. Software architectures may or may not conform to a recognized standard architecture, but as is known in the art, generally define the high level structure of an application program including, but not limited to, the software elements used in the application program (e.g., data structures, the variables, classes, etc.), the internal software modules (e.g., internal functions) that process requests and responses, the external software modules (e.g., external functions) that may be invoked by the internal software modules, the relationships between the software elements, internal and external modules, and the properties of, and relationships between, the software elements, internal and external modules.

Application programs developed according to a standard software architecture are much easier for operators to develop, test, and maintain, while applications developed according to a non-standard architecture are not. Therefore, embodiments of the present disclosure are configured to automatically analyze the architectures of the client and server applications executing on the client device 20 and AS 30, respectively. Then based on that analysis, embodiments of the present disclosure are configured to recommend changes to the application code of one or both of the application programs, if needed, so that the current software architecture of the application programs can be made to comport with a standard application architecture.

To accomplish this function, the present disclosure configures each module or function in the client and server application programs to include a detector. As explained in more detail below, the detectors comprise code that, when executed by a computer processor, extracts information from request and/or response messages received at the function. These detectors then send that information to an application executing on a control server 40. Upon receipt, the control server 40 generates a representation of a current software architecture for one or both of the applications based on the received information, and compares the generated architecture representation to representations of a plurality of known standard architectures stored in a Knowledgebase (KB) 50. If a match cannot be found in the KB 50, at least to within a predetermined similarity threshold, the control server 40 will generate a notification to an operator indicating the deficiencies found in the current architecture, along with some recommendations for altering the current software architecture to conform to a standard software architecture.

Figure 2:
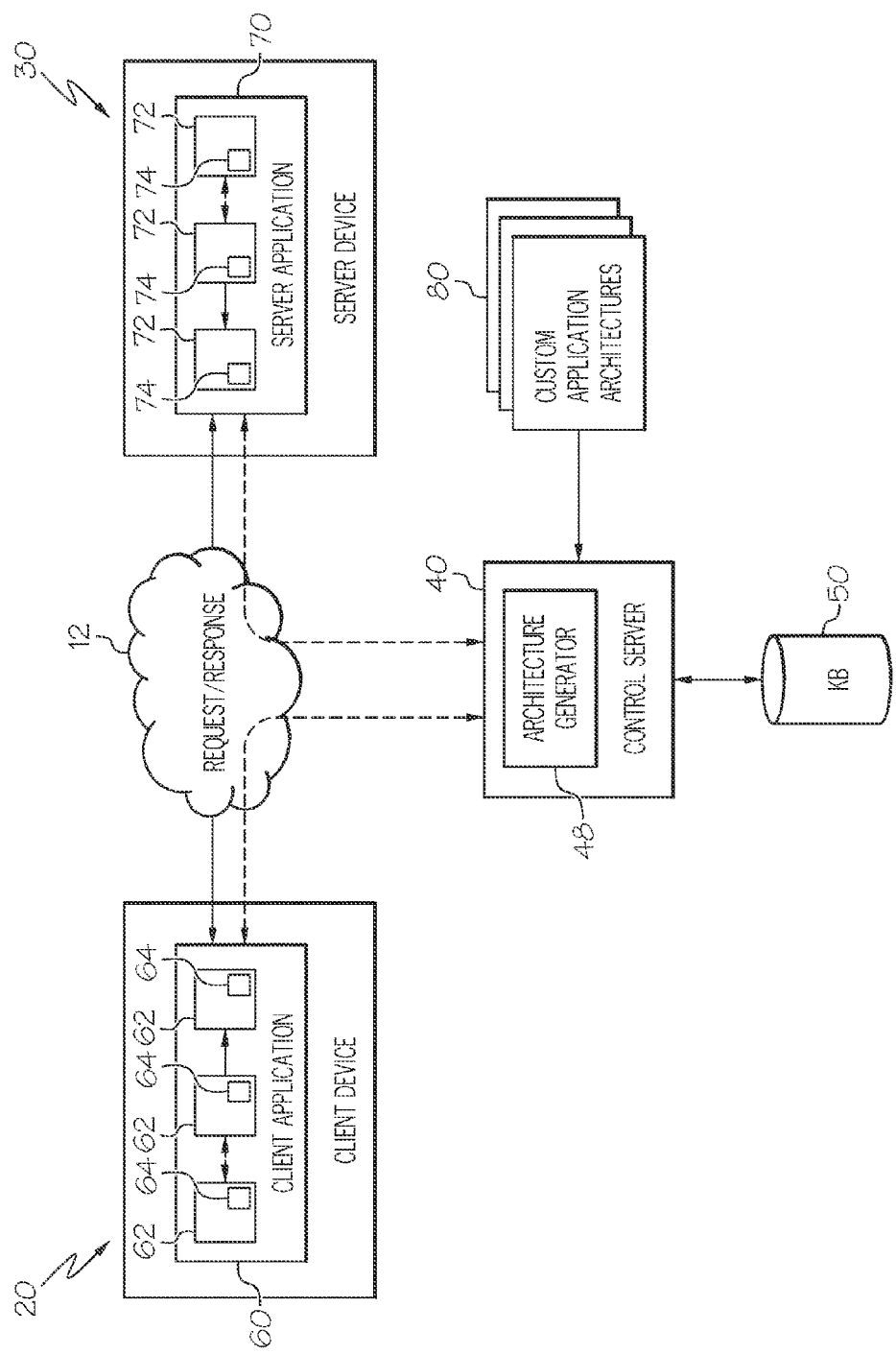
FIG. 2 is a block diagram illustrating some functional components of the software application programs that are analyzed according to one or more embodiments of the present disclosure, as well as an architecture generator that performs the analysis according to the present disclosure.

FIG. 2 is a block diagram illustrating how the present disclosure analyzes the architectures of a given software application according to one embodiment. More specifically, each of the client and server devices 20, 30 execute respective client and server application programs 60, 70. Additionally, each of the application programs 60, 70 comprise one or more modules or functions 62, 72, that communicate data and information with each other. Further, each of the one or more modules 62, 72, comprises a respective detector 64, 74 disposed at an input of the module 62, 72.

The control server 40 comprises an architecture generator 42, which communicates with the application programs 62, 72, as well as with the KB 50 that stores the representations of the known standard architectures for software applications. Additionally, the architecture generator 42 is capable of receiving one or more representations of additional, customized software architectures 80 for custom applications, and storing them in KB 50 as well. These architecture representations, as described in more detail below, will be compared with the representations of the actual architectures associated with the client and/or server applications 60, 70.

More particularly, client application 60 generates and sends one or more typical commands to server application 70. The commands may be any commands needed or desired, but in one embodiment, are selected to ensure that most or all of the key components of the server application 70, as well as its supporting applications and functions, are invoked for a given task. Upon receipt at the server application 70, the detectors 74 at each module 72 extract predetermined information from the command parameters.

Such information includes, but is not limited to, the classes or function calls, database access calls, commands to invoke database operations, web services calls, and the like. The extracted information is then sent to architecture generator 42, where it is compared to the existing architectures stored in KB 50. Additionally, or alternatively, the architecture generator 42 may compare the extracted information to the one or more custom application architectures 80. The results of the comparison reveal the differences between the current architecture of the server application 70 and the software architecture of a model software program that is most similar to the server application 70. Based on these differences, if any, the architecture generator 42 will generate a notification to the operator indicating the differences, as well as a standard architecture, for the server application 70. Additionally, in some embodiments, the architecture generator 42 will also suggest some changes that can be made to the server application code to conform that application to one of the standard or custom architectures.

In addition, the server application 70 obtains the requested data and sends that data back to the requesting client application 60. Upon receipt, the client application 60 processes the received data using its modules 64. However, as above, the detectors 64 disposed at the code modules 62 will intercept and extract information received from the server application 70, and forward that extracted information to the architecture generator 42 at control server 40. The architecture generator 42 will then process that received information to determine whether the architecture of the client application 60 matches any of the standard, or custom, application architectures 50, 80. If not, the architecture generator 42 will generate and send a notification indication to an operator indicating the discrepancies, and suggesting changes to the client-side code, for example, to ensure that the software architecture for the client application 60 conforms to one of the standard or custom architectures.

Figure 3:
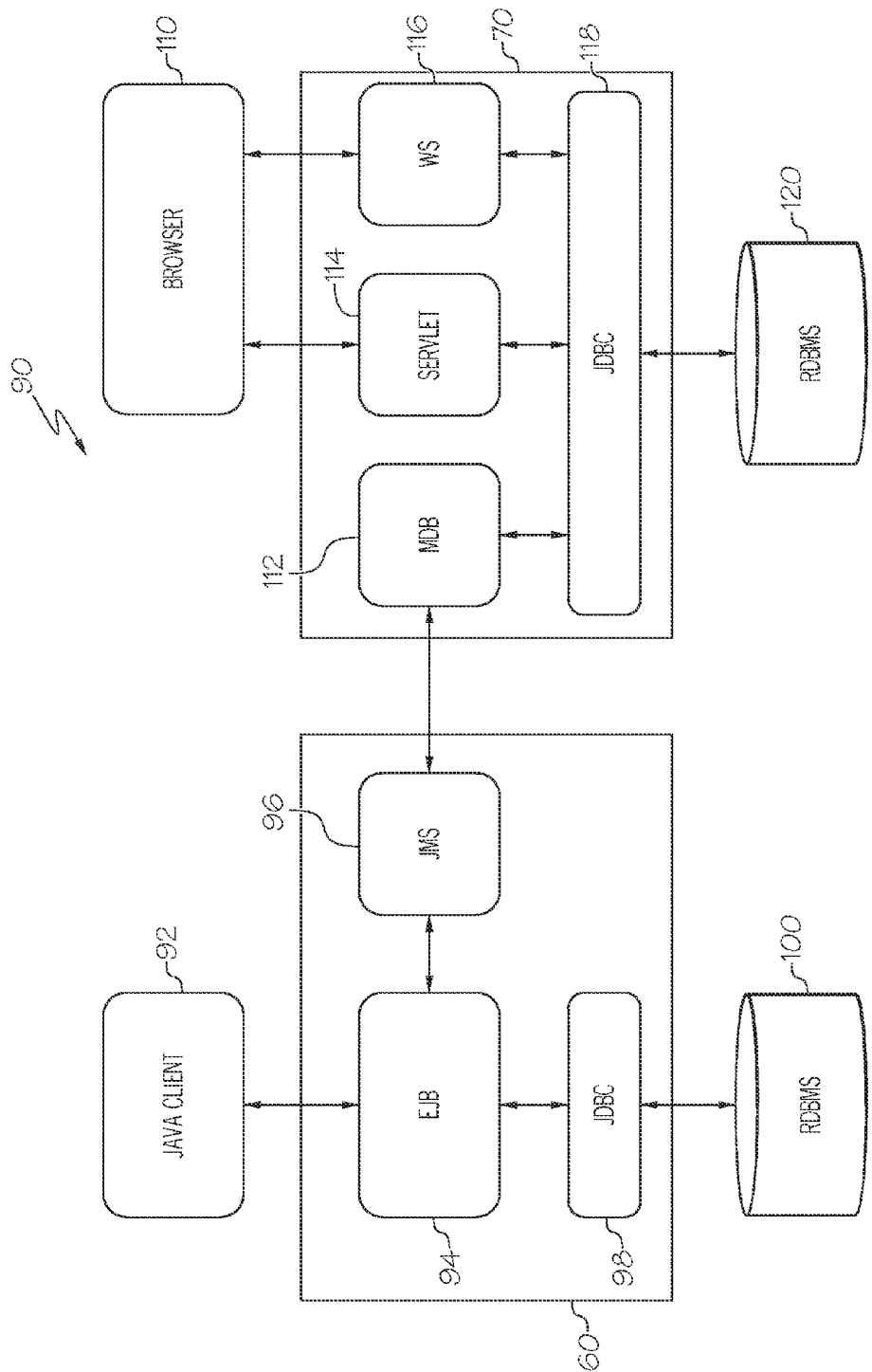
FIG. 3 is a block diagram illustrating some components of an application architecture that may be validated according to one embodiment of the present disclosure.

FIG. 3 is a block diagram illustrating some of the components of an example architecture 90 that may be validated according to one or more embodiments of the present disclosure. Those of ordinary skill in the art should appreciate that not all applications under test will include, or call functions from, each of these components. Rather, some applications may only include or call functions from some of these components. Additionally, it should be noted that the components in FIG. 3 are related specifically to JAVA; however, this is for illustrative purposes only. The present disclosure is not limited to JAVA specific architectures, and in fact, can be utilized with the architectures associated with other programming platforms and paradigms.

The architecture 90 components seen in FIG. 3 identify some of the components that could comprise, or be called by, the client application 60. Such components include a JAVA client component 92, a browser component 110, an Enterprise JavaBeans (EJB) component 94, A Java Message Service (JMS) component 96, and a Java Database Connectivity (JDBC) component 98 that facilitates data communications with a Relational Database Management System (RDBMS) 100. The server application 70, which is able to communicate with browser component 110, may comprise other components, such as a Message Driven Bean (MDB) component 112, a Servlet component 114, a Web Services (WS) component 116, and another JDBC component 118 that facilitates communications between the components 112, 114, and 116 of server application 70 with an RDBMS 120, which may be the same, or different from, RDBMS 100.

The particular functions of each of these components, as well as how the components are integrated into and/or used by an application program, are well-known in the art and not germane to the present disclosure. Therefore, the specific details related these components are not described in detail herein. It is enough to understand that the functions of one or more of these components may exist in, or be invoked by, an application program under test, and thus, each of these components is detectable by the detectors 64, 74 to generate the application architecture as previously stated.

In more detail, the detectors 64, 74 of the application functions are configured to extract information from the incoming parameters that accompany a function call when the function is invoked. Alternatively or additionally, the detectors 64, 74 may have access to a list of components that are associated with the invocation of its given function. Other ways to obtain this architecture information are possible. However, regardless of how the information is obtained, the embodiments of the present disclosure identify these components while the application program is being executed (i.e., at runtime), and store the component identifiers in memory in a structured text file, such as an XML file, for example, for comparison to other text files stored in KB 50 representing standard and/or custom architectures. By comparing these architectures (e.g., the XML files) to each other, the embodiments of the present disclosure can determine whether the architecture of a program under test matches, at least to within some predefined threshold, one or more of the standard and/or custom architectures.

Figure 4:
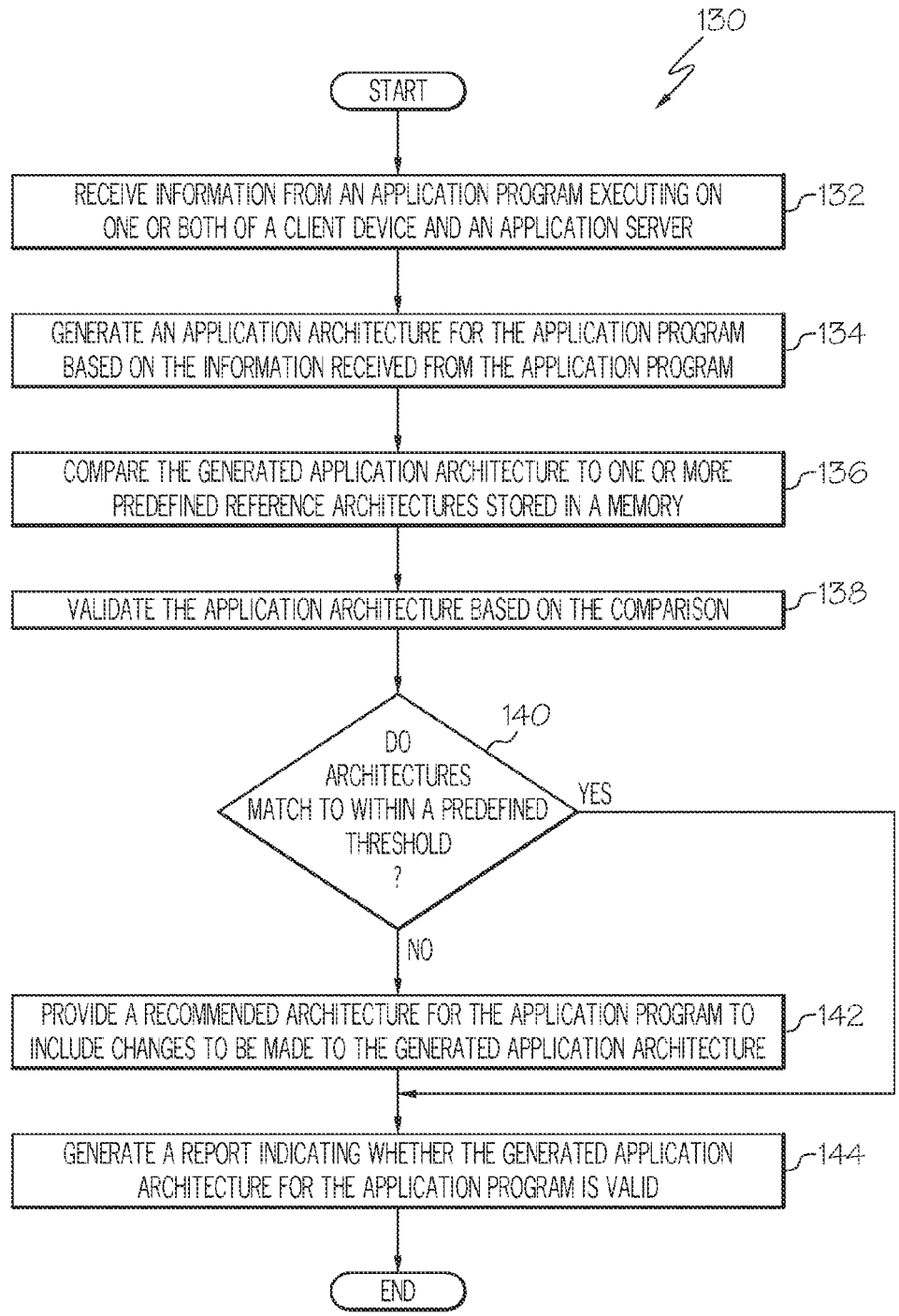
FIG. 4 is a flow diagram illustrating a method for analyzing the architecture of an application program according to one embodiment of the present disclosure.

FIG. 4 is a flow diagram illustrating a method 130 for autonomously validating an architecture of a given software application. The method is performed, in this embodiment, by the architecture generator 48 at control server 40. However, those of ordinary skill in the art will appreciate that the present disclosure is not so limited. Method 130 may be performed at other computing devices in addition to, or in lieu of, control server 40.

Method 130 begins with the application generator 48 of control server 40 receiving information from the detectors 64, 74 of the application programs 60, 70 executing on one or both of the client device 20 and the server device 30 (box 132). As previously stated, the received information may identify the various high-level components (e.g., the standard J2EE components such as those seen in FIG. 3), and/or various lower-level components (e.g., sub-components such as specified classes, functions, etc.). Regardless of the components, however, application generator 48 will use the received information to generate a representation of the current architecture for the application program(s) 60, 70 that sent the information (box 134). The representation of the architecture may be generated and saved into any structure known in the art, but in one embodiment, the representation of the architecture is generated as an XML file. This allows the application generator 48 to easily compare the generated representation to the representations of one or more predefined reference architectures (e.g., the standard architectures and the custom architectures) stored in the KB 50 (box 136).

The application generator 48 configured according to method 130 will then validate the current architecture based on the results of the comparison (box 138). Particularly, the application generator 48 will determine whether the generated architecture (i.e., the contents of the XML file representing the generated architecture) matches, at least to within a predefined threshold, another XML file representing a predefined standard or custom architecture stored in KB 50 (box 140). If there is a substantial match (e.g., 85% of the contents of the XML files match), the application generator 48 may generate a report indicating that the architecture of the application under test is validated (box 144). If the results indicate a less than an acceptable match (e.g., <85%), application generator 48 may provide a recommended architecture for the application under test (box 142).

By way of example only, the application generator 48 may recommend that the user modify the application under test to reflect the architecture that most closely matched that of the generated architecture for application program 60, 70. Additionally or alternatively, application generator 48 may recommend that the user modify the application to conform to a completely different architecture based on an analysis of the types of function calls made by the application program. For example, application generator 48 could recommend an architecture suitable for applications that make a lot of database accesses if the application generator 48 determines, based on the information received from the detectors 64, 74, that the application under test mainly performs these functions. Regardless of whether the application generator 48 makes such a suggestion, however, application generator 48 generates a report indicating the results of whether the generated application architecture for the application is validated (box 144).

Figure 5:
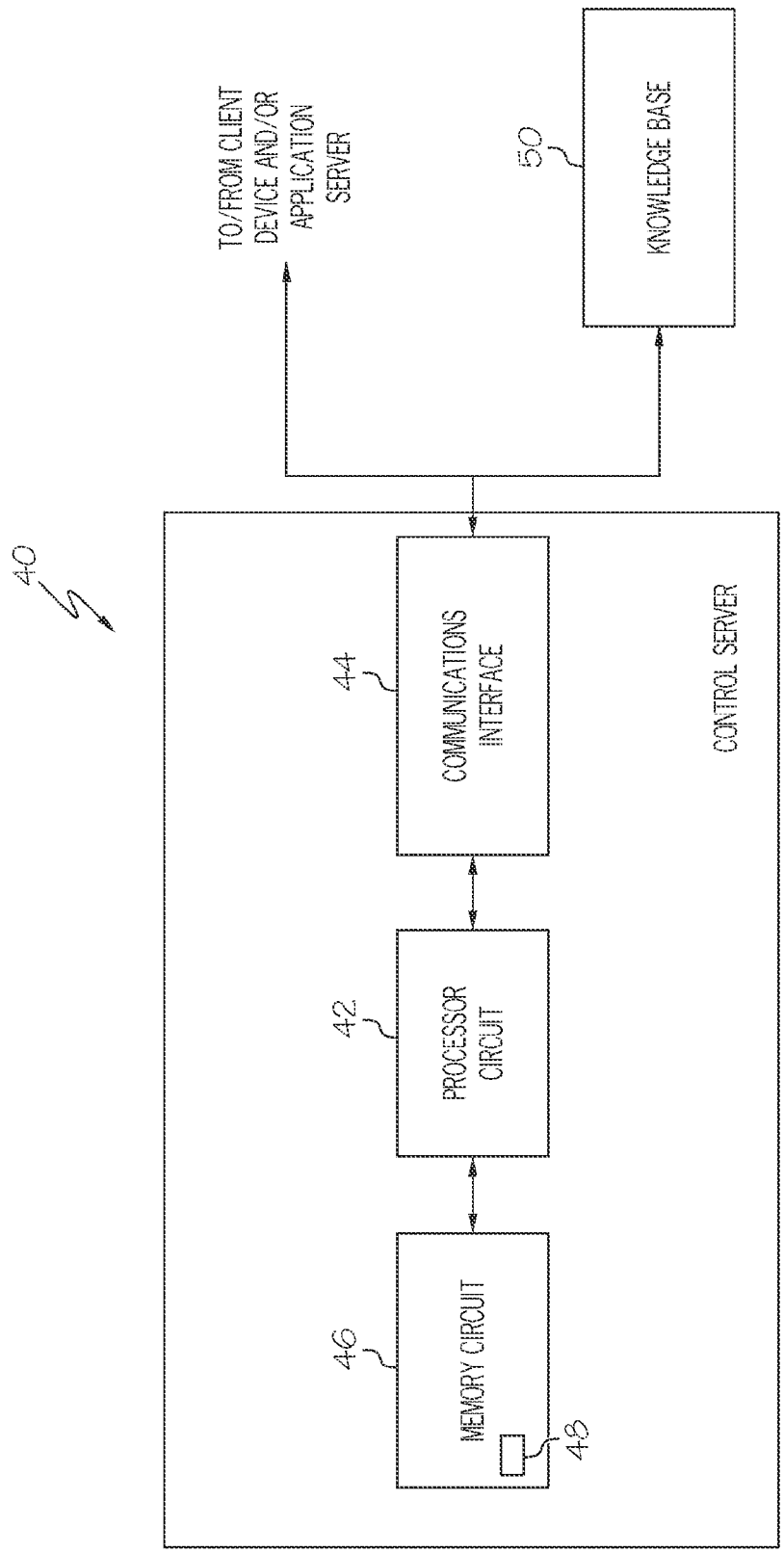
FIG. 5 is a block diagram illustrating some functional components of a control server executing an architecture generator according to one embodiment of the present disclosure.

FIG. 5 is a block diagram illustrating some of the functional components of a control server 40 configured to validate the generated architectures according to the embodiments previously described. As seen in FIG. 5, the control server 40 comprises a processor circuit 42, a communications interface 44, and a memory circuit 46 that stores a control application, such as application generator 48.

The processor circuit may be implemented by one or more microprocessors, hardware, firmware, software, or a combination thereof, and generally controls the operation and functions of control server 40 according to the appropriate standards. Such operations and functions include, but are not limited to, communicating with KB 50, as well as with the client and server applications 60, 70 executing, respectively, on client device 20 and server device 30, as previously described. In this regard, the processor circuit 42 may be configured to the implement logic and instructions of application generator 48 stored in memory 46 to perform the functionality of the embodiments of the present disclosure, as previously described. Such functions include, but are not limited to, the receipt of information from the detectors 64, 74, the analysis of that information to generate a representation of an application architecture currently used by the application under test, and the validation of that architecture against other predefined application architectures, as previously described.

The communications interface 44 comprises a transceiver or other communications interface that facilitates communications with the KB 50 and the client and server devices 20, 30 via IP network 12. Those of ordinary skill in the art will appreciate that the communications interface may be configured to communicate with these entities using any protocol known in the art. However, in one embodiment, the communications interface comprises an ETHERNET card configured to transmit and receive data using the well-known TCP/IP protocol.

Memory 46 may comprise any non-transitory, solid state memory or computer readable storage media known in the art. Suitable examples of such media include, but are not limited to, ROM, DRAM, Flash, or a device capable of reading computer-readable storage media, such as optical or magnetic media. The memory circuit 46 stores programs and instructions, such as application generator 48, that, as stated above, control the processor circuit 42 to receive information from the detectors 64, 74, analyze that information to generate the representation of the current application architecture, and validate that architecture against other predefined application architectures, as previously described.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   receiving, at a control device, information from an application program executing on a computing device, wherein the information comprises data associated with an architecture of the application program;
generating, at the control device, a representation of the architecture of the application program based on the information received from the application program, wherein generating a representation of the architecture of the application program comprises generating a text file identifying the functions of the application program that process the message at runtime, and the invocation relationships between the functions that process the message;
comparing, at the control device, the representation of the architecture of the application program to representations of predefined reference architectures stored in a memory, wherein comparing comprises comparing the text file to reference text files representing predefined reference architectures; and
validating, at the control device, the architecture of the application program based on a result of the comparing, wherein validating the architecture of the application program based on a result of the comparing comprises:
validating the architecture of the application program if the architecture matches one of the predefined reference architectures to within a predefined threshold: and
recommending an architecture for the application program if the representation of the architecture does not match the representation of the predefined reference architecture to within the predetermined threshold, wherein the recommended architecture is recommended according to a predetermined similarity threshold and providing recommendations for altering the architecture of the application program to conform with the recommended architecture.

2. The method of claim 1 wherein the data associated with the architecture of the application program identifies functions that process a message at runtime of the application program, and indicates an invocation relationship between the functions that process the message.

3. The method of claim 2 wherein the invocation relationship identifies a path traversed by the message through the functions of the application program that process the message.

4. The method of claim 2 wherein the data associated with the architecture of the application program further comprises runtime data processed by the functions that process the message.

5. The method of claim 1 further comprising generating, at the control device, a report indicating whether the architecture of the application program matches the predefined reference architecture to within the predefined threshold.

6. The method of claim 1 wherein the application program comprises a client application executing on a client device and wherein the architecture of the application program comprises the architecture for the client application.

7. The method of claim 1 wherein the application program comprises a server application executing on a server device in a communications network, and wherein the architecture of the application program comprises the architecture of the server application.

8. A control server device comprising:
a communications interface circuit configured to communicate with an application program executing on a computing device; and
a processing circuit configured to:
receive information from an application program executing on a computing device, wherein the information comprises data associated with an architecture of the application program;
generate a representation of the architecture of the application program based on the information received from the application program, wherein generating a representation of the architecture of the application program comprises generating a text file identifying the functions of the application program that process the message at runtime, and the invocation relationship between the functions that process the message;
compare the representation of the architecture of the application program to representations of predefined reference architectures stored in a memory, wherein comparing comprises comparing the text file to reference text files representing predefined reference architectures; and
validate the architecture of the application program based on a result of the comparing,
wherein to validate the architecture of the application program based on a result of the comparing, the processing circuit is configured to:
validate the architecture of the application program if the architecture matches one of the predefined reference architectures to within a predefined threshold: and
recommended an architecture for the application program if the representation of the architecture does not match the representation of the predefined reference architecture to within the predetermined threshold, wherein the recommended architecture is recommended according to a predetermined similarity threshold and providing recommendations for altering the architecture of the application program to conform with the recommended architecture.

9. The control server of claim 8 wherein the data associated with the architecture of the application program identifies:
functions that process a message at runtime of the application program; and
an invocation relationship between the functions that process the message, wherein the invocation relationship identifies a path traversed by the message through the functions of the application program that process the message.

10. The control server of claim 9 wherein the data associated with the architecture of the application program further comprises runtime data processed by the functions that process the message.

11. The control server of claim 8 wherein the processing circuit is further configured to generate a report indicating whether the architecture of the application program matches the predefined reference architecture to within the predefined threshold.

12. The control server of claim 8 wherein the application program comprises a client application executing on a client device and wherein the architecture of the application program comprises the architecture for the client application.

13. The control server of claim 8 wherein the application program comprises a server application executing on a server device in a communications network, and wherein the architecture of the application program comprises the architecture of the server application.

14. A computer-readable storage memory comprising computer-readable code that, when executed by a processing circuit on a computing device, configures the processing circuit to:
- receive information from an application program executing on a computing device, wherein the information comprises data associated with an architecture of the application program;
- generate a representation of the architecture of the application program based on the information received from the application program, wherein generating a representation of the architecture of the application program comprises generating a text file identifying the functions of the application program that processes the message at runtime, and the invocation relationships between the functions that process the message;
- compare the representation of the architecture of the application program to representations of predefined reference architectures stored in a memory, wherein comparing comprises comparing the text file to reference text files representing predefined reference architecture; and
- validate the architecture of the application program based on a result of the comparing,
  wherein to validate the architecture of the application program based on a result of the comparing, the computer-readable code configures the processing circuit to:
  - validate the architecture of the application program if the architecture matches one of the predefined reference architectures to within a predefined threshold: and
  - recommended an architecture for the application program if the representation of the architecture does not match the representation of the predefined reference architecture to within the predetermined threshold, wherein the recommended architecture is recommended according to a predetermined similarity threshold and providing recommendations for altering the architecture of the application program to conform with the recommended architecture.

\* \* \* \* \*